United States Patent
Lee et al.

(10) Patent No.: US 9,466,160 B2
(45) Date of Patent: Oct. 11, 2016

(54) METHOD FOR UNLOCKING DOOR, METHOD FOR RENTING ASSET AND SYSTEM THEREOF

(71) Applicant: Generalplus Technology Inc., Hsinchu (TW)

(72) Inventors: Kung-Wang Lee, Hsinchu (TW); Chia-Sheng Hsu, Hsin Chu (TW); Cheng-Chiang Liu, Hsinchu County (TW); Chih Hsiang Yang, Chang Hua County (TW)

(73) Assignee: GENERALPLUS TECHNOLOGY INC., Hsinchu (TW)

( * ) Notice: Subject to any disclaimer, the term of this patent is extended or adjusted under 35 U.S.C. 154(b) by 40 days.

(21) Appl. No.: 14/457,923

(22) Filed: Aug. 12, 2014

(65) Prior Publication Data

US 2015/0078137 A1 Mar. 19, 2015

(30) Foreign Application Priority Data

Sep. 18, 2013 (TW) .............................. 102133764 A

(51) Int. Cl.
*G07C 9/00* (2006.01)
*G08C 23/02* (2006.01)
*G06Q 10/02* (2012.01)

(52) U.S. Cl.
CPC .......... *G07C 9/00071* (2013.01); *G06Q 10/02* (2013.01); *G07C 9/00015* (2013.01); *G07C 9/00103* (2013.01); *G08C 23/02* (2013.01); *G07C 9/00023* (2013.01)

(58) Field of Classification Search
CPC ....... G08C 23/02; G06Q 10/02; G06Q 20/28
USPC .......................................... 367/198; 381/110
See application file for complete search history.

(56) References Cited

U.S. PATENT DOCUMENTS

| | | | | |
|---|---|---|---|---|
| 6,161,005 A | * | 12/2000 | Pinzon | G07C 9/00182 340/5.2 |
| 8,299,894 B1 | * | 10/2012 | Semeniuk | B60R 25/00 307/10.2 |
| 2002/0049535 A1 | * | 4/2002 | Rigo | G01C 21/3679 701/431 |
| 2008/0169899 A1 | * | 7/2008 | Bauman | B60R 25/257 340/5.23 |
| 2011/0060480 A1 | * | 3/2011 | Mottla | G06Q 10/02 701/2 |
| 2012/0157079 A1 | * | 6/2012 | Metivier | G07C 9/00182 455/420 |
| 2012/0229253 A1 | * | 9/2012 | Kolar | B60R 25/257 340/5.61 |
| 2014/0293753 A1 | * | 10/2014 | Pearson | G08C 23/02 367/197 |

* cited by examiner

*Primary Examiner* — Jennifer Mehmood
*Assistant Examiner* — Omar Casillashernandez
(74) *Attorney, Agent, or Firm* — Muncy, Geissler, Olds & Lowe, P.C.

(57) ABSTRACT

A method for unlocking a door, a method for renting asset and a system thereof are provided in the present invention. The door includes an audio receiver, and the method includes the steps of: storing a unlock sequence into a mobile device; performing a audio modulation to generates a audio modulation voiceprint signal, wherein the frequency range of the audio modulation voiceprint signal is in the audio frequency; playing the audio modulation voiceprint signal by using the speaker of the mobile device; when the audio receiver receives the audio modulation voiceprint signal, the method further includes: performing a audio demodulation to obtain the unlock sequence; and determining whether the door is unlock or not according to the unlock sequence.

10 Claims, 7 Drawing Sheets

METHOD FOR UNLOCKING DOOR, METHOD FOR RENTING ASSET AND SYSTEM THEREOF

This application claims priority of No. 102133764 filed in Taiwan R.O.C. on Sep. 18, 2013 under 35 USC 119, the entire content of which is hereby incorporated by reference.

BACKGROUND OF THE INVENTION

1. Field of Invention

The present invention relates to the technology for door unlocking, and more particularly to a method for unlocking doors, a method for renting assets and a system with voice modulation thereof.

2. Related Art

With the progress of economy and development of industries, people are more and more concern about the quality of residential décor and facilities. On the other aspect, modern people emphasize quality of life and personal life privacy. The safety of living environment, the atmosphere taste therefore becomes the critical assessment items by people. Doors are the first view of the residential places. They are also isolating facilities of the channel between each room. Thus, a well-designed door plays the character to increase the residential quality of life.

So far, doors of common families or institutions adopt mechanical door locks, which use keys to drive the bolts. This kind of door generally needs a physical key to unlock it. If the key is lost, the lock may not be opened. Also, the conventional mechanical door lock is easy to break by scoundrels. It performs poorly in security access control. Although, currently there are combination locks, electrical locks, and so on for security protection, they are still limited for the effect of thief prevention, and the unlock process is also more complicated. Besides, as far as security is concerned, the password of the combination lock can be stolen by video camera, the unlock command of the electrical lock may also be stolen by a password capture machine or a copy machine.

Thus, a biometric lock is adopted by users, such as a voiceprint lock. The voiceprint lock is mainly to capture the characteristics of the voice of users to perform identification verification. This application has flaws as follow:

1. A person's voice is changeable due to physical conditions, age, emotion and so on;
2. Different microphones or channels may affect the identifications
3. Environment noises may intervene the identifications
4. Voiceprint may be difficult to be fetched if multiple people's speaking is mixed.

Obviously, methods mentioned above cannot offer secure control of door access.

SUMMARY OF THE INVENTION

It is therefore an objective of the present invention to provide a method for unlocking a door. Through the unlock sequence stored in a mobile device, the mechanical waves emitted by the speaker of the mobile device work as a medium, in the audio frequency, the unlock sequence is modulated into the mechanical waves.

Another object of the present invention is to provide a method for renting assets, by using the abovementioned voice modulation, with an Internet mobile app to book the asset and to obtain the unlock sequence. Thus, when a user arrives the rental office, he can directly use the unlock sequence with the specific modulation to play the modulated voiceprint signal to unlock the rented asset.

In view of the above, the present invention provides a method for unlocking a door. The door is embedded an audio receiver. The unlocking method includes these processes: providing an unlock sequence in a mobile device; performing an audio signal modulation to the unlock sequence to generate a modulated voiceprint signal, wherein a frequency range of the modulated voiceprint signal is in an audio frequency; playing the modulated voiceprint signal through the speaker of the mobile device; wherein, when the audio receiver receives the modulated voiceprint signal, the method further includes below: performing an audio signal demodulation to obtain the unlock sequence; and determining whether the door should be unlocked or not according to a result of whether the unlock sequence conforms a preset unlock requirement.

In the method for unlocking a door according to the preferred embodiment of the present invention, in order to prevent skimming of the modulated voiceprint signal by an audio recorder of an interested person, the audio signal modulation is an audio spread spectrum modulation to averagely spread the energy of the modulated voiceprint signal over a band of the audio frequency. Moreover, in another embodiment of the present invention, in order to prevent skimming of the modulated voiceprint signal by an audio recorder of an interested person, the unlock sequence includes an unlock field and a synchronization sequence field, and the audio modulation includes: performing digital encoding to the unlock sequence to obtain digital code, wherein the digital encoding adopts a rolling code; and modulating the digital code with an audio carrier signal to obtain the modulated voiceprint signal. In a preferred embodiment, the frequency of the audio carrier signal is within a range of 12 KHz to 20 KHz such that the modulated voiceprint signal falls within the range of 12 KHz to 20 KHz.

In the method for unlocking a door according to the preferred embodiment of the present invention, performing a digital encoding to the unlock sequence to obtain a digital code includes: setting a door number sequence and a synchronization counting sequence in the unlock sequence, wherein the synchronization counting sequence includes a synchronization counting value; encoding the unlock sequence to obtain an encryption sequence, wherein the encryption sequence includes a fixed code sequence and a rolling code sequence, wherein the rolling code sequence is changed according to the synchronization counting value; and adding a preset value to the synchronization counting value in the synchronization counting sequence of the unlocking code whenever the modulation voiceprint signal emits.

In the method for unlocking a door according to the preferred embodiment of the present invention, performing an audio signal demodulation to obtain the unlock sequence includes: demodulating the modulation voiceprint signal with the audio carrier signal to obtain the encryption sequence; performing a decryption procedure to the rolling code sequence of the encryption sequence to obtain the door number sequence and the synchronization counting sequence; determining whether the difference between the synchronization counting value of the synchronization counting sequence and a door counting value falls within a preset range; determining whether the door number sequence and the fixed code sequence conform the door unlock requirement when the difference between the synchronization counting value of synchronization counting sequence and the door counting value falls within a preset range; and unlocking the door and adding the preset value to the door counting value to serve as the next door counting value when the door number sequence and the fixed code sequence conform the door unlock requirement.

According to the method for unlocking the door of the present invention, a method for renting an asset is provided. The asset is embedded an audio receiver. The method includes: performing an internet renting asset procedure through an application software of a mobile device; obtaining an unlock sequence and the corresponding asset number when a user finishes the internet renting asset procedures by utilizing the application software of the mobile device; wherein, when the user performs an unlocking procedure for the asset through the application software, the method further includes: performing an audio modulation to the unlock sequence generate a modulated audio signal; and playing the modulated audio signal through the speaker of the mobile device; wherein, when the audio receiver receives the modulated audio signal, the method further includes: performing an audio demodulation to obtain the unlock sequence; and determining whether the asset is unlocked or not according to the result of whether the unlock sequence conforms a preset unlock requirement.

According to the method for unlocking the door and renting the asset of the present invention, another system for renting assets is provided. The system includes plural assets and a rental server, wherein each asset respectively has a number, and is embedded an audio receiver and an audio demodulator. The audio demodulator is coupled to the audio receiver, for performing an audio demodulation to a received audio signal of the audio receiver. The rental server which connects to the internet has an asset connection port, wherein, when a user connects to the internet and performs a internet asset renting procedure through an application software of a mobile device, the rental server transmits an unlock sequence and an asset number corresponding to the unlock sequence to the mobile device, wherein the rental server transmits the unlock sequence to an asset corresponding to the asset number through the asset connection port. When the user performs an asset unlocking procedure, the procedure includes: performing an audio modulation to the unlock sequence to generate a modulated voiceprint signal; and playing the modulated voiceprint signal through the speaker of the mobile device. When the audio receiver receives the modulated voiceprint signal, the audio demodulator performs the audio demodulation to obtain the unlock sequence. The audio demodulator determines whether the asset should be unlocked or not according to the result of whether the unlock sequence conforms a preset unlock requirement.

The spirit of the present invention is to offer a method to unlock a door, by storing the unlock sequence in a mobile device and using its speaker to emit mechanical wave as a medium, mix the unlock sequence within the mechanical wave under the audio frequency. Moreover, use the method of unlocking a door by modulated voiceprint, coordinate a mobile application to prepay the rent and obtain the above-mentioned unlock sequence, then the user can use the unlock sequence with the designated modulation to emit the unlocking voice to use the rented asset once he arrives the rental office. Users don't have to spend extra time checking in at the counter. Thereby, it reduces the extra time of checking in which users would cost.

To make the characteristics, merits, and other objectives of the present invention more apprehensible, we will illustrate it with a preferred embodiment and the corresponding diagrams below

DETAILED DESCRIPTION OF THE INVENTION

Figure 1:
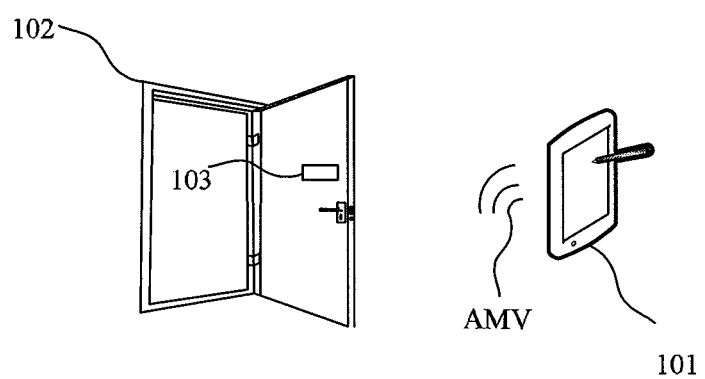
FIG. 1 is the diagram of a door unlocking system according to a preferred embodiment of the present invention

FIG. 1 is a diagram of the door unlocking system according to a preferred embodiment of the present invention. Please refer to FIG. 1. This door unlocking system includes a mobile device used by a user 101, a door 102, and its audio modulation lock 103. The user has to store the unlock sequence in that mobile device 101 before using this door unlocking system. When the user arrives the door 102 and performs unlocking, he/she can input the unlock sequence in the unlock app of the mobile device 101. At this time, the mobile device 101 modulates the unlock sequence and generate an audio modulation signal AMV. The methods of modulating such as FSK, ASK, PSK, and so on are all available. The frequency range of the audio modulation signal AMV is in the audio frequency. Generally speaking, it is within the frequency which is between 10 Hz to 20 KHz.

After finishing modulation, the speaker of the mobile device 101 starts to play the audio modulation voiceprint signal AMV, which also means it converts the electrical audio modulation voiceprint signal AMV to mechanical voice wave. Correspondingly, there is a microphone in the voiceprint door lock 103 to accept the audio modulation voiceprint signal AMV. When the microphone of the voiceprint door lock 103 receives the audio modulation voiceprint signal AMV, the voiceprint door lock 103 demodulates the audio modulation voiceprint signal AMV to decode and get the unlock sequence, and then it verifies if the unlock sequence conforms the requirement. When the unlock sequence conforms it, the voiceprint door lock 103 unlocks the door 102.

Since the decoded unlock sequence of the above-mentioned embodiment is modulated through the carrier signal of the audio frequency, the modulated audio modulation voiceprint signal AMV falls within the frequency between 10 Hz to 20 KHz. Therefore, the audio modulation voiceprint signal AMV can be played directly by the speaker of the mobile device 101. Furthermore, the audio modulation voiceprint signal AMV will not be changed even the user gets sick or his vocal cords age. Therefore, the embodiment of the present invention can actually control the door access security. Also, it won't cause the awkward situation which the door 102 cannot be unlocked because the user's physical status changes.

Figure 2:
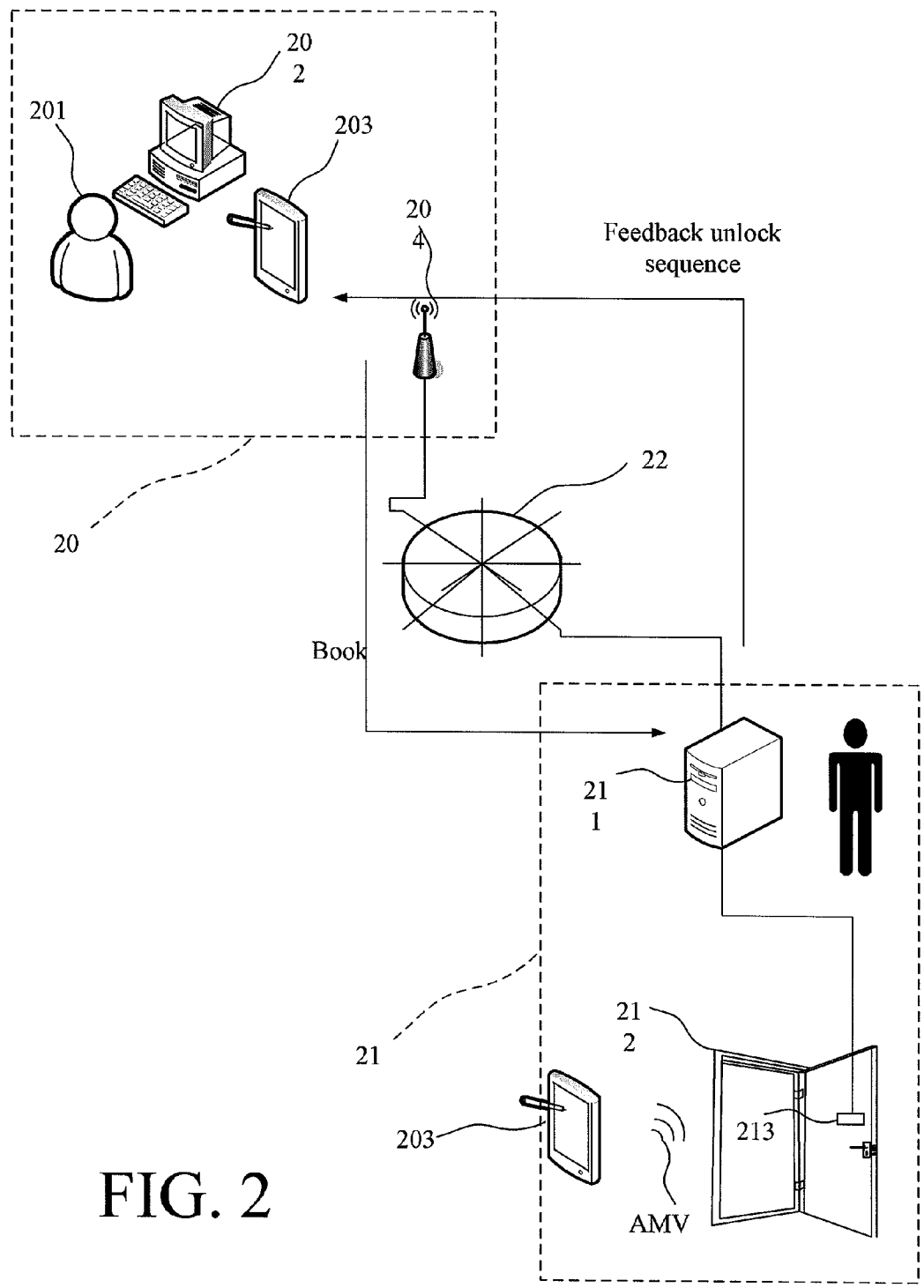
FIG. 2 is the diagram of a asset renting system according to a preferred embodiment of the present invention

To make people having ordinary skill in the art understand the application of the embodiment of the present invention, an example of an asset rental system implemented by the above-mentioned method of door unlocking is provided below. FIG. 2 is a diagram of the asset rental system according to a preferred embodiment of the present invention. Please refer to FIG. 2, this asset rental system includes a client side 20, a rental system side 21 and the internet 22. To make people having ordinary skill in the art understand the application of the embodiment of the present invention, assuming that the asset rental system is applied to a hotel room reservation system in this embodiment. It also assumed that a user has to prepay on the internet through a designated application software of a PC 201 or a mobile internet device (a cell phone or a tablet) 202 of the client side 20 when the user books a room through this hotel room reservation system. In this embodiment, assuming that the client side adopts wireless network (Wi-Fi or 3G network) 204 to connect to the internet. It is assumed that the user operates the designated application software of the mobile internet device 202 and books a room through wireless network (Wi-Fi or 3G network) 204. When he finishes booking a room, such as paying by a credit card online, the server 211 of the rental system side 21 would issue a message of booking success, a door information and an unlock sequence to the user's mobile internet device 202 through the Internet 22. Meanwhile, the server 211 transmits the unlock sequence and its corresponding unlock information through the asset connection port (wired or wireless) to the door 211 which is rented by the user.

When the user arrives the hotel 21, he can just go the reserved room directly without checking in at the counter of the hotel. When the user arrives the room he booked, he can take out his mobile Internet device 202 and run the designated application software to perform the door unlocking processes. When the door unlocking processes are running, the designated application software performs a voice modulation according to the unlock sequence and the mobile internet device 202 plays the audio modulation voiceprint signal AMV through the speaker of the mobile internet device 202. When the voice receiving device 213 of the door 212 receives the audio modulation voiceprint signal AMV, it converts the audio modulation voiceprint signal AMV to an electrical signal, then, the demodulation circuits embedded inside the door 212 start the demodulation processes and verify the correctness of the unlock sequence. If the unlock sequence is successfully verified, it will unlock the door 212.

In the above-mentioned embodiment, although it only depicts one door 212, people having ordinary skill in the art should realize that there is not only one room on the rental system side. One door 212 in the diagram is exemplified as a representative. And the description below is omitted.

Figure 3:
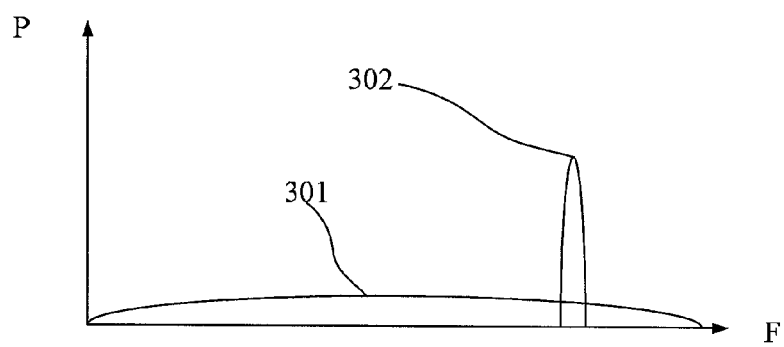
FIG. 3 is the diagram of a modulation spectrum of voiceprint signal modulation signal AMV according to a preferred embodiment of the present invention.

In the above-mentioned embodiment, in order to prevent the audio modulation voiceprint signal AMV from being skimmed by a recording device, an embodiment depicting a voice modulation is provided. FIG. 3 is a diagram of the modulation spectrum of the audio modulation voiceprint signal AMV according to a preferred embodiment of the present invention. Please refer to FIG. 3, in this embodiment, the label 301 represents a spectrum diagram depicting the spread spectrum modulation adopted by the embodiment of the present invention, the label 302 represents a spectrum diagram depicting a generic modulation, such as amplitude modulation (AM), frequency modulation (FM), single sideband (SSB) and so on. In this embodiment, the code of the unlock sequence is divided into multiple segments, each segment is transmitted through a different channel, the modulation method may be the frequency division multiplexing FDM or the orthogonal frequency division multiplexing OFDM.

In the spectrum diagram, it is observed that the energy in the spectrum 301 of the spread spectrum modulation adopted by the embodiment of the present invention is much lower than which is done by the conventional technology. Spectrum 301 reflects on the mechanical wave, which means the voice of the audio modulation voiceprint signal AMV played by the mobile Internet device 202 or the mobile communication device 101 is similar to the background sound. Therefore, the interested people cannot skim the audio modulation voiceprint signal AMV unless his recording device is extremely close to the speaker of the mobile internet device 202 or the mobile communication device 101. Besides, another merit of the spread spectrum modulation is that the user will not hear any harsh sound caused by playing the audio modulation voiceprint signal AMV.

Figure 4:
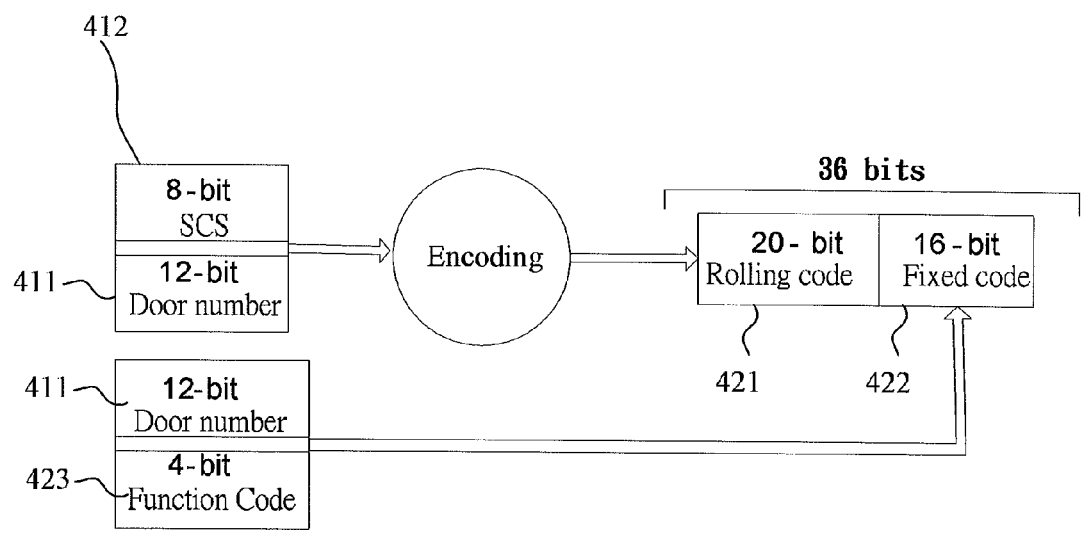
FIG. 4 is the diagram of the encoding of an unlock sequence according to a preferred embodiment of the present invention.

Equally, in the above-mentioned embodiment, in order to prevent the audio modulation signal AMV from being skimmed by a recording device, in the following embodiment, the above-mentioned generic modulation 302 is adopted. However, the unlock sequence is encoded separatedly. FIG. 4 is a diagram of the encoding of an unlock sequence according to a preferred embodiment of the present invention. Please refer to FIG. 4, this embodiment is applied to hotel room rental system such as the above-mentioned one in FIG. 2. In the embodiment, the unlock sequence 41 includes not only a 12 bits length door number field 411, but also add an 8 bits synchronization counting field 412. The digital number of the synchronization counting field 412 would increase according to the number whenever the user executes the designated application software to play the audio modulation signal AMV.

In the above-mentioned embodiment, assuming that every time the user operates the designated application software to perform the door unlocking process, the 12 bits length door number field 411 and the 8 bits synchronization counting field 412 will be encoded into a 20 bits rolling code rolling code 421 and a 16 bits fixed code 422, wherein the 16 bits length fixed code 422 includes the above-mentioned 12 bits length door number field 411 and a 4 bits length function code 423.

Figure 5:
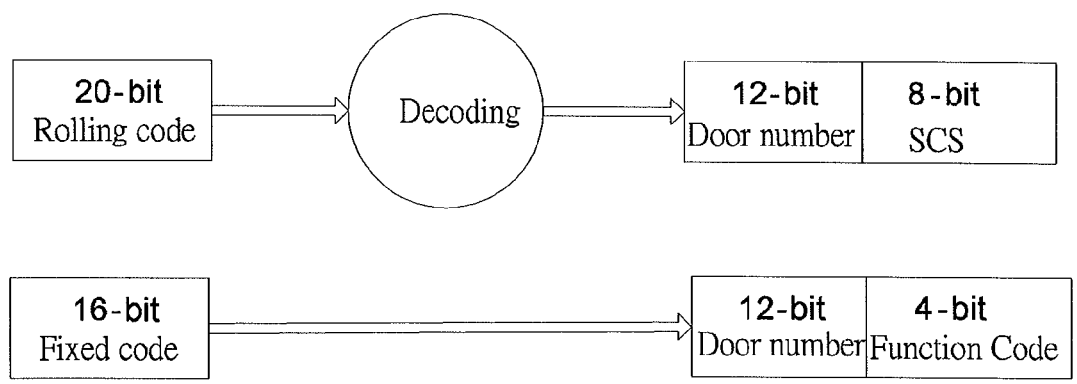
FIG. 5 is the diagram of the decoding of an unlock sequence according to a preferred embodiment of the present invention.

FIG. 5 is a diagram depicting the decoding of an unlock sequence according to a preferred embodiment of the present invention. Please refer to FIG. 5, when the voice receiving device 213 of the door 212 receives the audio modulation signal AMV, it converts the above-mentioned audio modulation signal AMV to electrical signal. Afterward, the modulation circuit embedded inside the door 212 will start the process of demodulation, and then the 20 bits length rolling code 421 and the 16 bits fixed code 422 are obtained. Next, the demodulation circuit embedded inside the door 212 performs the decoding procedure 501 to the 20 bits length rolling code 421 to obtain a 12 bits length door number 502 and an 8 bits length synchronization counting field 503. Meanwhile, the 16 bits length fixed code is divided into the door number 504 and the function code 505. At this time, the demodulation circuit embedded inside the door 212 checks whether the door number in the 16 bits length fixed code 422 is the same as the one which is decoded from the rolling code 421. When the door number 502 decoded from the rolling code 421 and the door number 503 of the 16 bits length fixed code 422 are identical, the demodulation circuit embedded inside the door 212 checks whether the door number stored in the door 212 is the same as the door number 502 decoded from the rolling code 421 and the door number 504 of the fixed code 422. When the door number stored in the door 212 is the same as the above-mentioned door number 502 decoded from the rolling code 421 and the door number 504 of the fixed code 422, the demodulation circuit embedded inside the door 212 compares the synchronization counting value stored inside the door 212 with the synchronization counting value 503 decoded from the rolling code 421. In this embodiment, there are rules to the comparison of the synchronization counting value 503, which are shown on the table below.

TABLE 1

|  | The difference of the counting number stored in the door | Newly received counting number | The difference | The follow-up actions |
|---|---|---|---|---|
| Example 1 | 100 | 98 | −2 | No action |
| Example 2 | 100 | 105 | 5 | Action |
| Example 3 | 105 | 125 | 20 | No action and wait for the next command |
|  | 105 (125 stored in the memory) | 126 | 21 (1) | Re-synchronize and action |

First, the newly received synchronization counting value (decoded) of the door 212 have to be greater than the older one stored in the door. Generally speaking, every time the user successfully opens the door, the relative control circuit embedded inside the door 212 stores the synchronization counting value sent from the mobile internet device 202 or the mobile communication device 101 when the door is successfully opened. If an interested person uses a recording device to skim the above-mentioned audio modulation voiceprint signal AMV at this time, and then plays it to the door 212, as the example 1 shown on the table 1 above, the demodulation circuit embedded inside the door 212 compares the stored synchronization counting value with the newly received one, and the newly received one is smaller than the stored one. Thus, it will not perform unlocking.

Next, in the example 2, also, the user performs the door unlocking, at this time, the synchronization counting value stored in the relative control circuit embedded inside the door 212 is 100, the newly received one is 105. Generally speaking, there is a certain range allowed for the designed synchronization counting value, which is called synchronizing verification difference. In this embodiment, the synchronizing verification difference is 16. In other word, if the synchronization counting value stored in the relative control circuit embedded inside the door 212 is 100, the allowed range of newly received synchronization counting value to unlock is between 101 to 116. In this example, the user opens the door successfully, and the synchronization counting value stored in the relative control circuit embedded inside the door 212 renews to 105.

Next, in the example 3, the user performs door unlocking, at this time, the synchronization counting value stored in the relative control circuits embedded inside the door 212 is 105, the newly received one is 125. The difference of the two is 20, which is greater than the synchronizing verification difference 16. Therefore, the door 212 is inactive, and temporarily stores the synchronizing counting value 125 into temporary storage and waits for a user performs door unlocking again. In this example, a temporary synchronizing verification difference is embedded in the door 212, the temporary synchronizing verification difference is 4. Next time when the user unlocks the door, the newly received synchronization counting value by the door 212 is between 126 to 130, then the door 212 can perform unlocking itself. In this example, the newly received synchronization counting value is 126, therefore, the relative control circuit embedded inside the door 212 re-synchronizes, stores new synchronization counting value 126, and performs unlocking.

According to the above-mentioned embodiment, it is observed that even if it does not use spread spectrum, and the interested people can skim the audio modulation voiceprint signal AMV, however, the synchronization counting value in the skimmed audio modulation voiceprint signal AMV is smaller than the one stored in the door 212, the door still cannot be unlocked.

Figure 6:
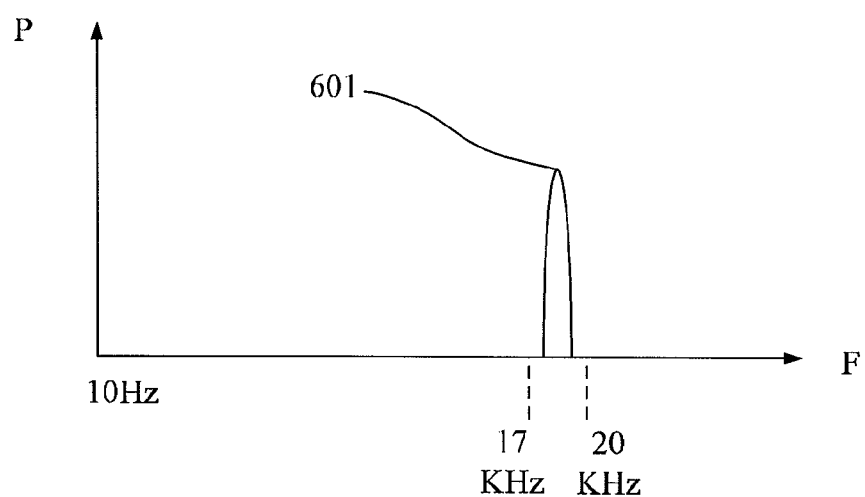
FIG. 6 is the diagram of a modulation spectrum of audio modulation voiceprint signal AMV according to a preferred embodiment of the present invention.

Moreover, FIG. 6 is a diagram of the modulation spectrum of the audio modulation voiceprint signal AMV according to a preferred embodiment of the present invention. Please refer to FIG. 6, the label 601 represents the generic modulation spectrum adopted by the embodiment of the present invention. In this embodiment, the spectrum energy of the audio modulation voiceprint signal AMV of the mechanical wave falls on the frequency between 17 KHz to 20 KHz. There is a feature of the frequency band between 17 KHz to 20 KHz. The frequency in this band is actually unheard by the acoustic organs of the human. For the highest sensible frequency of human's hearing is 15.1 KHz. Generally speaking, younger people may sense the sound wave, whose frequency is between 16 KHz to 20 KHz, through the human body, skull and cranium to the auditory area of human brain. Therefore, they sense the existence of this sound wave. However, normal adults can barely hear or sense sounds of this frequency. Therefore, to modulate and to play the audio modulation voiceprint signal AMV with this frequency band, human ears would not hear any strident or unnatural voice at all.

Furthermore, practically, the frequency response of the external speaker of some mobile devices cannot react the signal whose frequency is between 17 KHz to 20 KHz, or its corresponding audio processing devices cannot generate the signal whose frequency is between 17 KHz to 20 KHz. For dealing with this kind of situation, in another preferred embodiment, the frequency band between 12 KHz to 16 KHz is adopted to perform voice modulation. Although this frequency band can be heard to normal users, but the feeling to the sound wave of this frequency band is duller to human ears. Even sound waves in this frequency band are emitted with major amplitude, it will not be felt very loud by human ears.

Figure 7A:
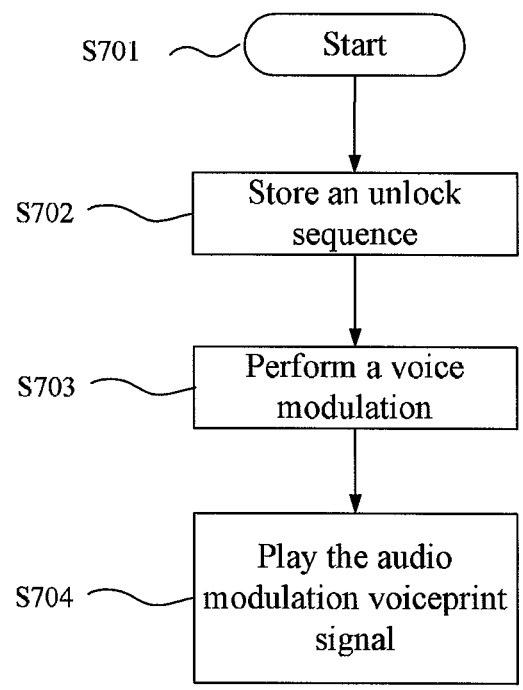
FIG. 7A is the diagram of the user side of the method for door unlocking according to a preferred embodiment of the present invention.

According the above-mentioned door unlocking system in FIG. 1, a method of door unlocking can be summarized. The FIG. 7A is a flowchart of the client side of the method for door unlocking according to a preferred embodiment of the present invention. Please refer to the FIG. 7A, the method for door unlocking in the client side include the steps as follow.

In step S701, the method starts.

In step S702, the unlock sequence is stored in the mobile device 101.

In step S703, a voice modulation to the unlock sequence is performed to generate an audio modulation voiceprint signal AMV.

In step S704, the audio modulation voiceprint signal AMV is played through the speaker of the mobile device 101.

Figure 7B:
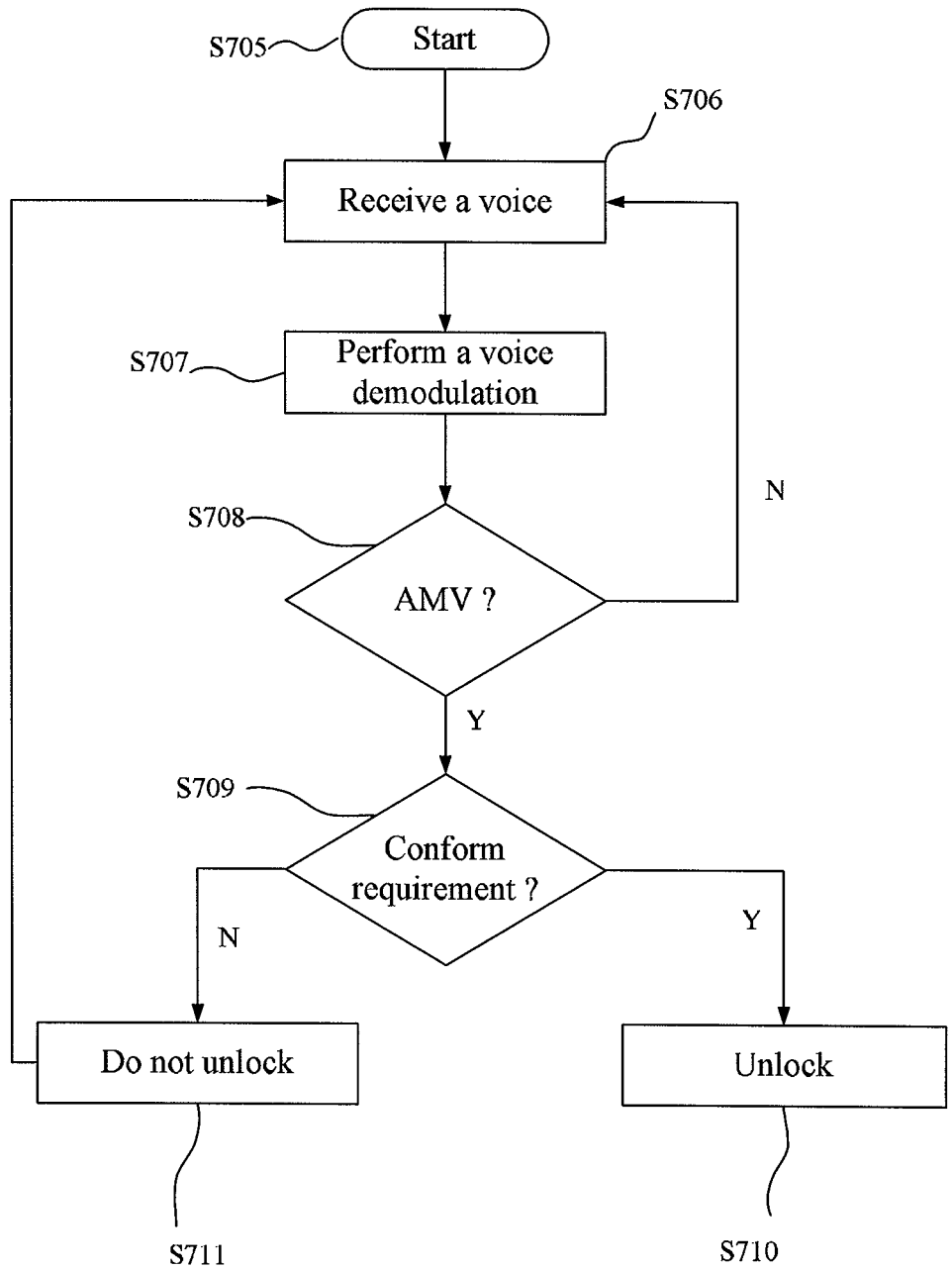
FIG. 7B is the diagram of the part of the door of the method for door unlocking according to a preferred embodiment of the present invention.

FIG. 7B is a flowchart of the door side of the method of door unlocking according to a preferred embodiment of the present invention. Please refer to the FIG. 7B, the method of door unlocking in the door side include the steps as follow.

In step S705, the method starts.

In step S706, voice is received. Receive voice through the voice receiving devices embedded inside the door.

In step S707, a voice demodulation is performed. If received voice is the audio modulation voiceprint signal AMV, and then the unlock sequence is obtained in this step.

In step S708, it is determined whether it is audio modulation voiceprint signal AMV or not. If it is verified that the received voice is the audio modulation voiceprint signal AMV, the step S709 is performed; otherwise, go back to the step S706.

In step S709, it is determined whether the unlock sequence conforms the requirements or not. If it conforms the requirements, the step S710 is performed; otherwise, the step S711 is performed.

In step S710, the unlock procedure is performed.

In step S711, the unlock procedure is not performed and go back to the step S705.

Figure 8A:
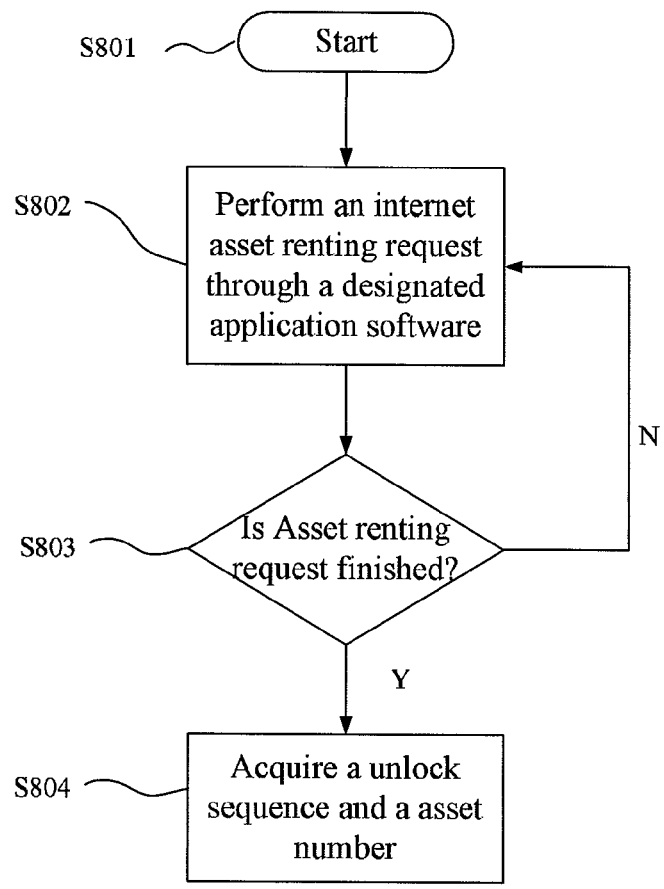
FIG. 8A is the diagram of a user side of the method for asset renting according to a preferred embodiment of the present invention.

Similarly, according the above-mentioned asset rental system in FIG. 2, a method of asset renting can be summerized. FIG. 8A is a flowchart of the client side of the method of asset renting according to a preferred embodiment of the present invention. Please refer to the FIG. 8A, the method of asset renting in client side include the steps as follow.

In step S801, the method starts.

In step S802, an internet asset renting request is performed through a designated application software of a mobile device.

In step S803, it is determined whether the internet asset renting request is finished. If it is finished, the step S804 is performed; otherwise go back to the step S802 then continue the internet asset renting procedure.

In step S804, When the user uses the designated application software of the mobile device to finish the internet asset renting procedure, an unlock sequence and its corresponding asset number are obtained.

Figure 8B:
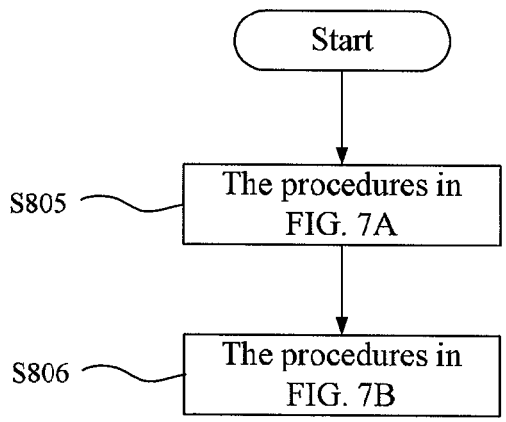
FIG. 8B is the diagram of the rental part of the method for asset renting according to a preferred embodiment of the present invention.

FIG. 8B is a flowchart of the rental end of the method of asset renting according to a preferred embodiment of the present invention. Please refer to the FIG. 8B, as the user finishes the asset renting, he can use the procedure of FIG. 7A (the step S805) and procedure of FIG. 7B (the step S806) to perform the asset unlocking without extra checking in at the counter. It can save the users' time and the deployment of the human resources at the part of the rental.

In the above-mentioned embodiment, although the hotel room reservation is adopted to serve as an example of the asset renting, people having ordinary skill in the art should know that the present invention can be applied to car and motorcycle rental or other industries. The present invention is not limited thereto. Moreover, the embodiments in FIG. 4 and the embodiments in FIG. 5, the bit length of each field are only demonstrative example. People having ordinary skill in the art should know the bit length of each field may be changeable according to different designs. Thus, the present invention is not limited thereto.

In summary, the spirit of the present invention is to provide a method for unlocking a door. Through the unlock sequence stored in a mobile device, the mechanical waves emitted by the speaker of the mobile device work as a medium, in the audio frequency, the unlock sequence is modulated into the mechanical waves. Moreover, by using the abovementioned unlocking method of voice modulation, with an internet mobile app to prepay and to obtain the above-mentioned unlock sequence. Thus, when a user arrives the rental office, he can directly use the above-mentioned unlock sequence with the specific modulation to play the unlocking voiceprint signal to use the above-mentioned assets. Users don't have to spend extra time checking in at the counter. Thereby, it reduces the extra time of checking in which users would cost.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A method for unlocking a door, wherein the door comprises an audio receiver, wherein the method comprises:
   providing an unlock sequence stored in a mobile device, wherein an application software is installed in the mobile device;
   performing an audio signal modulation to the unlock sequence to generate a modulated audio signal by the application software when user tries to open the door and performing the application software through the mobile device, wherein a frequency range of the modulated audio signal is in an audio frequency;
   playing the modulated audio signal through a speaker of the mobile device;
   wherein, when the audio receiver receives the modulated audio signal, the method further comprises:
   performing an audio signal demodulation to obtain the unlock sequence; and determining whether the door is unlocked or not according to a result of whether the unlock sequence conforms a preset unlock requirement;
   wherein, in order to prevent skimming of the modulated audio signal by an audio recorder of an interested person, the unlock sequence comprises an unlock field and a synchronization sequence field, and the audio modulation comprises:
   performing a digital encoding to the unlock sequence to obtain a digital code, wherein the digital encoding adopts a rolling code; and
   modulating the digital code with an audio carrier signal to obtain the modulated audio signal;
   wherein performing the digital encoding to the unlock sequence to obtain a digital code comprises:
   setting a door number sequence and a synchronization counting sequence in the unlock sequence, wherein the synchronization counting sequence includes a synchronization counting value;
   encoding the unlock sequence to obtain an encryption sequence, wherein the encryption sequence includes a fixed code sequence and a rolling code sequence, wherein the rolling code sequence is changed according to the synchronization counting value; and
   adding a preset value to the synchronization counting value in the synchronization signal counting sequence of the unlocking code whenever the modulated audio signal is emitted;

wherein performing the audio signal demodulation to obtain the unlock sequence comprises:

demodulating the modulated audio signal with the audio carrier signal to obtain the encryption sequence;

performing a decryption procedure to the rolling code sequence of the encryption sequence to obtain the door number sequence and the synchronization counting sequence;

determining whether the difference between the synchronization counting value of synchronization counting sequence and a door counting value falls within a preset range;

determining whether the door number sequence and the fixed code sequence conforms a door unlock requirement when the difference between the synchronization counting value of synchronization counting sequence and the door counting value falls within a preset range; and unlocking the door and adding the preset value to the door counting value to serve as the door counting value when the door number sequence and the fixed code sequence conforms the door unlock requirement.

2. The method according to claim 1, wherein the audio signal modulation is an audio spread spectrum modulation to spread an energy of the modulated audio signal over a band of the audio frequency such that skimming of the modulated audio signal by an audio recorder of an interested person can be prevented.

3. The method according to claim 1, wherein a frequency of the audio carrier signal is within a range of 12 KHz to 20 KHz such that the modulated voiceprint audio signal falls within the range of 12 KHz to 20 KHz.

4. The method according to claim 1, wherein the method is adapted for a reservation system of a hotel, and the method further comprises:

performing an internet reservation through an application software of the mobile device;

obtaining the unlock sequence and a door number corresponding to the unlock sequence when a user finishes a reservation procedure by utilizing the application software of the mobile device;

wherein, when the user performs door unlocking procedure through the application software, the method further comprises:

performing the audio modulation to the unlock sequence to generate the modulated audio signal; and playing the modulated audio signal through the speaker of the mobile device.

5. A method for renting an asset, wherein the asset comprises an audio receiver, wherein the method comprises:

performing an internet renting asset procedure through an application software of a mobile device;

obtaining an unlock sequence and an asset number when a user finishes the internet renting asset procedure by utilizing the application software of the mobile device, wherein the application software is installed in mobile device, and the unlock sequence is stored in the mobile device;

wherein, when the user tries to open the asset and performs an unlocking procedure for the asset through the application software in the mobile device, the method further comprises:

performing an audio modulation to the unlock sequence to generate a modulated audio signal; and playing the modulated audio signal through a speaker of the mobile device;

wherein, when the audio receiver receives the modulated audio signal, the method further comprises:

performing an audio demodulation to obtain the unlock sequence; and determining whether the asset is unlocked or not according to the result of whether the unlock sequence conforms a preset unlock requirement;

wherein, in order to prevent skimming of the modulated audio signal by an audio recorder of an interested person, the unlock sequence comprises an unlock field and a synchronization sequence field, and the audio modulation comprises:

performing a digital encoding to the unlock sequence to obtain a digital code, wherein the digital encoding adopts a rolling code; and modulating the digital code with an audio carrier signal to obtain the modulated audio signal;

wherein performing a digital encoding to the unlock sequence to obtain a digital code comprises:

setting an asset number sequence and a synchronization counting sequence in the unlock sequence, wherein the synchronization counting sequence includes a synchronization counting value;

encoding the unlock sequence to obtain an encryption sequence, wherein the encryption sequence includes a fixed code sequence and a rolling code sequence, wherein the rolling code sequence is changed according to the synchronization counting value; and adding a preset value to the synchronization counting value in the synchronization counting sequence of the unlocking code whenever the modulated audio signal emits;

wherein performing an audio signal demodulation to obtain the unlock sequence comprises:

demodulating the modulated audio signal with the audio carrier signal to obtain the encryption sequence;

performing a decryption procedure to the rolling code sequence of the encryption sequence to obtain the asset number sequence and the synchronization counting sequence;

determining whether the difference between the synchronization counting value of synchronization counting sequence and an asset counting value falls within a preset range;

determining whether the asset number sequence and the fixed code sequence conforms a door unlock requirement when the difference between the synchronization counting value of synchronization counting sequence and the asset counting value falls within a preset range; and unlocking the asset and adding the preset value to the asset counting value to serve as the asset counting value when the asset number sequence and the fixed code sequence conforms the door unlock requirement.

6. The method according to claim 5, wherein the audio signal modulation is an audio spread spectrum modulation to spread an energy of the modulated audio signal over a band of the audio frequency such that skimming of the modulated audio signal by an audio recorder of an interested person can be prevented.

7. The method according to claim 5, wherein a frequency of the audio carrier signal is within a range of 12 KHz to 20 KHz such that the modulated voiceprint audio signal falls within the range of 12 KHz to 20 KHz.

8. A system for renting an asset, comprising:
a plurality of assets, wherein each asset respectively comprises a number, and each asset respectively comprises:
an audio receiver; and
an audio demodulator, coupled to the audio receiver, for performing an audio demodulation to a received audio signal of the audio receiver;
a rent server, having an asset connection port, wherein the rent server connects to an internet, wherein, when a user connects to the internet and performs an internet renting asset procedure through an application software of a mobile device, the rent server transmits an unlock sequence and an asset number corresponding to the unlock sequence to the mobile device, wherein the rent server transmits the unlock sequence to an asset corresponding to the asset number through the asset connection port;
wherein, the application software is installed in mobile device, and the unlock sequence is stored in the mobile device,
wherein, when the user tries to open the asset and performs an asset unlocking procedure through the application software in the mobile device, the procedure comprises:
performing an audio modulation to the unlock sequence to generate a modulated audio signal; and
playing the modulated audio signal through a speaker of the mobile device;
wherein, when the audio receiver receives the modulated audio signal, the audio demodulator performs the audio demodulation to obtain the unlock sequence,
wherein the audio demodulator determines whether the asset is unlocked or not according to the result of whether the unlock sequence conforms a preset unlock requirement;
wherein, in order to prevent skimming of the modulated audio signal by an audio recorder of an interested person, the unlock sequence comprises an unlock field and a synchronization sequence field, and the audio modulation of the mobile device comprises:
performing a digital encoding to the unlock sequence to obtain a digital code, wherein the digital encoding adopts a rolling code; and
modulating the digital code with an audio carrier signal to obtain the modulated audio signal;
wherein performing a digital encoding to the unlock sequence to obtain a digital code comprises:

setting an asset number sequence and a synchronization counting sequence in the unlock sequence, wherein the synchronization counting sequence includes a synchronization counting value;
encoding the unlock sequence to obtain an encryption sequence, wherein the encryption sequence includes a fixed code sequence and a rolling code sequence, wherein the rolling code sequence is changed according to the synchronization counting value; and
adding a preset value to the synchronization counting value in the synchronization counting sequence of the unlocking code whenever the modulated audio signal emits;
wherein performing an audio signal demodulation to obtain the unlock sequence comprises:
demodulating the modulated audio signal with the audio carrier signal to obtain the encryption sequence;
performing a decryption procedure to the rolling code sequence of the encryption sequence to obtain the asset number sequence and the synchronization counting sequence;
determining whether the difference between the synchronization counting value of synchronization counting sequence and an asset counting value falls within a preset range;
determining whether the asset number sequence and the fixed code sequence conforms a door unlock requirement when the difference between the synchronization counting value of synchronization counting sequence and the asset counting value falls within a preset range; and
unlocking the asset and adding the preset value to the asset counting value to serve as the asset counting value when the asset number sequence and the fixed code sequence conforms the door unlock requirement.

9. The system according to claim 8, wherein the audio signal modulation is an audio spread spectrum modulation to spread an energy of the modulated audio signal over a band of the audio frequency such that skimming of the modulated audio signal by an audio recorder of an interested person can be prevented.

10. The method according to claim 8, wherein a frequency of the audio carrier signal is within a range of 12 KHz to 20 KHz such that the modulated voiceprint audio signal falls within the range of 12 KHz to 20 KHz.

* * * * *